F. I. HODGE.
STEERING WHEEL FOR AUTOMOBILES AND OTHER MOTOR VEHICLES.
APPLICATION FILED DEC. 30, 1911.
1,044,387.  Patented Nov. 12, 1912.
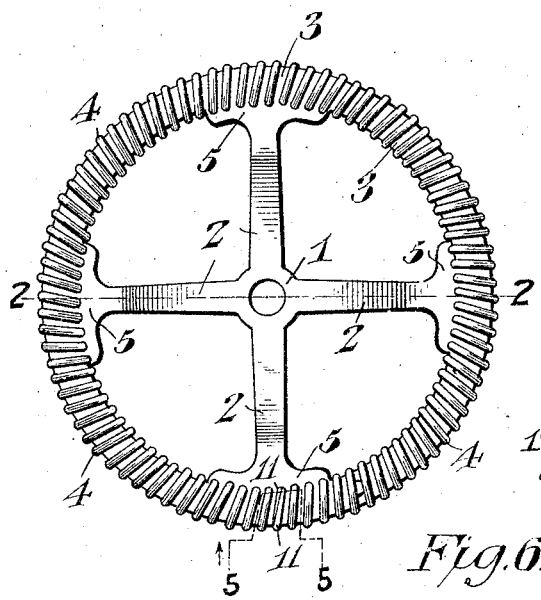
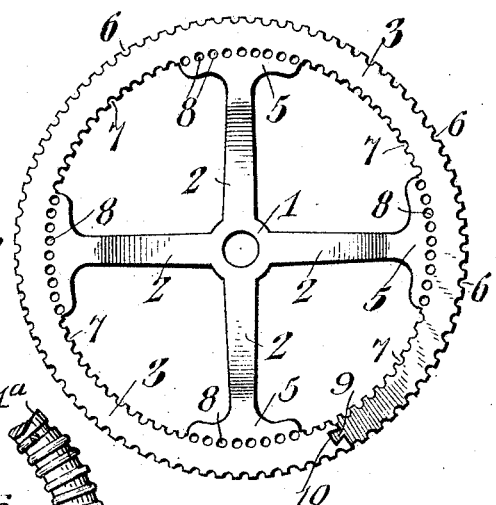
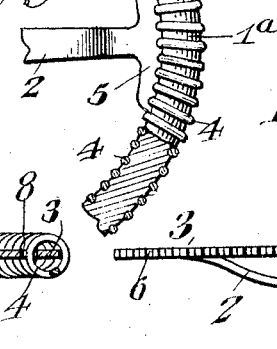
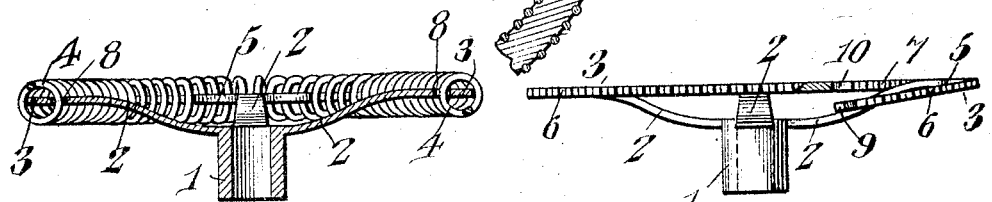
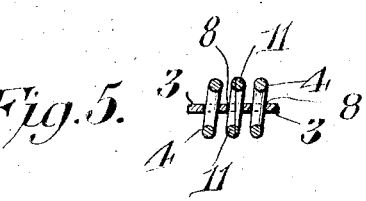
Fred I. Hodge, INVENTOR
WITNESSES

UNITED STATES PATENT OFFICE.

FRED I. HODGE, OF MIDDLETOWN, CONNECTICUT.

STEERING-WHEEL FOR AUTOMOBILES AND OTHER MOTOR-VEHICLES.

1,044,387. Specification of Letters Patent. Patented Nov. 12, 1912.

Application filed December 30, 1911. Serial No. 668,787.

*To all whom it may concern:*

Be it known that I, FRED I. HODGE, a citizen of the United States, residing at Middletown, in the county of Middlesex and State of Connecticut, have invented a new and useful Steering-Wheel for Automobiles and other Motor-Vehicles, of which the following is a specification.

The invention relates to improvements in steering wheels for automobiles, trucks and various other motor vehicles.

The object of the present invention is to improve the construction of steering wheels for automobiles and other motor vehicles, and to provide a simple, efficient and comparatively inexpensive steering head or wheel of great strength and durability, which will not warp or split and which will afford a firm and secure grip and prevent the hands of a chauffeur from slipping without necessitating wrapping the rim with tape, cord or the like.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a plan view of a steering wheel, constructed in accordance with this invention. Fig. 2 is a vertical sectional view on the line 2—2 of Fig. 1. Fig. 3 is a plan view of the steering wheel, showing the same before the spiral wire grip is applied. Fig. 4 is an edge view of the same, the dove-tailed portions of the rim being sprung apart. Fig. 5 is a section on the line 5—5 of Fig. 1. Fig. 6 is a detail plan view partly in section, illustrating another form of the invention.

Like numerals of reference designate corresponding parts in all the figures of the drawing.

In the accompanying drawing in which is illustrated the preferred embodiment of the invention, the steering wheel comprises a central hub 1, spokes 2 and a rim 3, which supports a spiral wire grip 4. The hub 1, the spokes 2 and the rim, which are preferably formed integral, may be constructed of any suitable material, and the spokes are preferably curved, as shown, to present a steering wheel of the conventional form, but they may be constructed in any other preferred manner, and they are provided with enlarged outer portions 5 adjacent to the rim of the wheel.

The rim of the wheel, which is shown relatively thin and flat in the accompanying drawing, may be round, as shown at 1ª in Fig. 6 of the drawing or any other preferred shape and may be constructed hollow to lessen the weight. The rim 3 is provided with outer and inner grooves or notches 6 and 7 to receive and form seats for the coils of the spiral wire grip, whereby when the latter is arranged on the rim of the steering wheel, the coils will be positively maintained in fixed relation to afford a rigid non-resilient grip, which will effectually prevent the hands of the chauffeur from slipping. The inner and outer grooves or notches, which form shoulders for engaging the coils to prevent any movement of the same on the rim of the wheel, are arranged to suit the spiral character of the wire grip, the seats at the outer edge of the rim being located opposite the intervals or spaces between the seats at the inner edge of the rim. The inner grooves or notches are located between the spokes 2 of the wheel, and the enlarged portions 5 of the spokes are provided with arcuate series of perforations 8, which receive the adjacent coils of the spiral wire grip and complete the inner annular series of seats for the said coils.

The rim 3 is split adjacent to one of the spokes, and one of the ends formed by the split is provided with a dove-tailed projection 9, which fits in a dove-tailed recess 10 of the other end of the rim, when the two ends are in alinement. One of the ends formed by the split portion of the rim is adapted to be sprung beyond the other end a sufficient distance to permit the spiral wire grip to be wound in place on the rim, and after the wire is arranged on the rim, the sprung portion of the latter is permitted to return to its normal position with the dove-tailed lug in engagement with the dove-tailed recess. The spiral wire will retain the dove-tailed portions in their interlocked relation. After the spiral wire grip has been fed or wound on the rim of the wheel, the ends 11 of the wire, which are beveled, are placed in the same hole or perforation at the center of the enlarged portions of one of the spokes and are sweated together, as clearly indicated in Fig. 1 of the drawing. While it is preferable to feed the spiral wire on the rim of the wheel at the split portion, yet the spiral grip may be applied to the rim in any other preferred manner.

What is claimed is:—

1. A steering wheel of the class described including a rim, and a spiral wire grip encircling the rim, the latter supporting the inner and outer portions of the coils of the spiral grip through the entire periphery of the wheel and being provided with seats receiving and maintaining the coils of the grip in spaced relation, whereby the coils are maintained in fixed relation to form a rigid grip for preventing the hands from slipping.

2. A steering wheel of the class described including a hub, spokes, a rim provided at its inner and outer peripheries with grooves or notches forming inner and outer series of seats, said rim being also provided at the outer ends of the spokes with perforations completing the inner series of seats, and a spiral wire grip arranged on the rim with its coils in the seats formed by the grooves or notches and the perforations, whereby the coils are maintained in fixed relation to provide a rigid grip.

3. A steering wheel of the class described including a hub, spokes, a rim provided at its inner and outer peripheries with grooves or notches forming inner and outer series of seats, said rim being also provided at the outer ends of the spokes with perforations completing the inner series of seats, and a spiral wire grip arranged on the rim with its coils in the seats formed by the grooves or notches and the perforations, whereby the coils are maintained in fixed relation to provide a rigid grip, the terminals of the wire of the grip being beveled and fitted against each other and secured together in one of said perforations.

4. A steering wheel of the class described including spokes, and a flat rim provided at its inner and outer edges with seats, and a spiral wire grip arranged on the rim with its coils in the seats thereof, said rim being split between the spokes to enable the terminals formed by the split to be sprung apart to permit the spiral wire grip to be wound on the rim.

5. A steering wheel of the class described including spokes, and a flat rim provided at its inner and outer edges with seats, and a spiral wire grip arranged on the rim with its coils in the seats thereof, said rim being split between the spokes to enable the terminals formed by the split to be sprung apart to permit the spiral wire grip to be wound on the rim, one of the terminals of the rim being provided with a dove-tailed lug and the other having a dove-tailed recess receiving the lug when the terminals are in their normal position.

In testimony, that I claim the foregoing as my own, I have hereto affixed my signature in the presence of two witnesses.

FRED I. HODGE.

Witnesses:
ELLSWORTH C. HEDGES,
CLARINDA A. HEDGES.